United States Patent
Ulrey et al.

(10) Patent No.: US 8,544,446 B2
(45) Date of Patent: *Oct. 1, 2013

(54) FLUID INJECTION PRESSURIZATION SYSTEM

(71) Applicant: Ford Global Technologies, LLC, Dearborn, MI (US)

(72) Inventors: Joseph Norman Ulrey, Dearborn, MI (US); Ross Dykstra Pursifull, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/741,106

(22) Filed: Jan. 14, 2013

(65) Prior Publication Data

US 2013/0125858 A1    May 23, 2013

Related U.S. Application Data

(63) Continuation of application No. 12/691,528, filed on Jan. 21, 2010, now Pat. No. 8,353,270.

(51) Int. Cl.
- *F02B 3/00* (2006.01)
- *F02B 13/00* (2006.01)
- *F02G 5/00* (2006.01)

(52) U.S. Cl.
USPC ............................ 123/299; 123/557; 123/575

(58) Field of Classification Search
USPC ................. 123/299, 300, 304, 490, 491, 543, 123/545–547, 549, 525, 557, 558, 575, 1 A, 123/25 A–25 D, 25 N, 25 P, 25 R; 701/101, 701/103–105, 111–115

See application file for complete search history.

(56) References Cited

U.S. PATENT DOCUMENTS

| | | | |
|---|---|---|---|
| 4,050,419 A | 9/1977 | Harpman et al. | |
| 4,324,209 A | 4/1982 | Gerry | |
| 4,556,368 A | 12/1985 | Jean et al. | |
| 4,841,943 A | 6/1989 | Favreau et al. | |
| 5,033,439 A | 7/1991 | Eygret | |
| 6,155,212 A | 12/2000 | McAlister | |
| 6,365,905 B1 | 4/2002 | Koyama et al. | |
| 6,578,532 B1 | 6/2003 | Rowley | |
| 7,043,350 B2 | 5/2006 | Abe et al. | |
| 7,287,509 B1 | 10/2007 | Brehob | |
| 7,409,926 B2 | 8/2008 | Sun et al. | |
| 7,426,925 B2 | 9/2008 | Leone et al. | |
| 7,444,230 B2 | 10/2008 | Cheiky | |
| 7,856,950 B2 | 12/2010 | Kuzuoka et al. | |
| 7,921,833 B2 | 4/2011 | Bidner et al. | |
| 8,353,270 B2 * | 1/2013 | Ulrey et al. | ............ 123/299 |
| 2005/0147513 A1 | 7/2005 | Noble et al. | |
| 2007/0163537 A1 | 7/2007 | Kamio et al. | |
| 2007/0283927 A1 | 12/2007 | Fukumoto et al. | |
| 2008/0035106 A1 | 2/2008 | Stein | |
| 2008/0308063 A1 | 12/2008 | Funakoshi et al. | |

* cited by examiner

*Primary Examiner* — John Kwon
*Assistant Examiner* — Johnny Hoang
(74) *Attorney, Agent, or Firm* — Julia Voutyras; Alleman Hall McCoy Russell & Tuttle LLP

(57) ABSTRACT

A system including, an internal combustion engine including a combustion chamber, a first injector to provide a first injection fluid to the combustion chamber, and a heated pressurization system to heat the first injection fluid in a pressure vessel to achieve a sufficient injection pressure. By heating the injection fluid in a pressure vessel, pressure in the vessel can be increased to a specified injection pressure.

12 Claims, 4 Drawing Sheets

FLUID INJECTION PRESSURIZATION SYSTEM

CROSS REFERENCE TO RELATED APPLICATIONS

The present application is a continuation of U.S. patent application Ser. No. 12/691,528 filed Jan. 21, 2010, the entire contents of which are incorporated herein by reference for all purposes.

BACKGROUND AND SUMMARY

Water and/or alcohol, such as Water/Methanol/Ethanol (WME) may be injected, alone or in combination, into cylinders of a spark-ignition engine in order to increase operating efficiency, fuel economy, and/or operational life of the engine. For example, WME may be injected into a cylinder to reduce peak cylinder temperature/pressure. By lowering peak cylinder temperature/pressure, cylinder degradation may be reduced to increase the operational life of the engine. As another example, WME may be injected into a cylinder to suppress engine knock. By suppressing engine knock, the engine may be operated at a higher compression ratio to permit higher engine output or increased fuel economy. Further, WME may be injected into a spark-ignition engine to reduce tailpipe emissions. For example, WME may be injected into a cylinder to reduce exhaust/emission control device temperature (e.g. catalyst). By reducing exhaust emission control device temperature, the emission control device temperature may be maintained within a desired temperature range to improve conversion of feedgas emissions.

Various strategies and configurations may be implemented to inject WME into cylinders of a spark-ignition engine in order to achieve the above described benefits. In one example approach, a dual fuel injection system in which each cylinder includes a direct injection (DI) injector and a port injection (PI) injector is reconfigured so that the DI injector is dedicated to injecting WME and the PI injector is dedicated to injecting a type of fuel. Accordingly, fuel can be injected via port injection to handle engine torque demands, while WME can be injected via direct injection to improve engine operating efficiency, fuel economy, emission control, etc. The DI injector may be dedicated to injecting WME because direct injection may improve vaporization of the injected fluid relative to port injection. Such vaporization may be beneficial for dealing with certain conditions, such as to suppress engine knock.

However, the inventors have recognized several potential issues with such an approach. For example, to improve vaporization/atomization of injected fluids, fluids need to be delivered to injectors at high pressure at startup, dual injection systems include a high pressure positive displacement pump to increase the pressure of fluid injected by the DI injector to a suitable injection pressure level. The high pressure pumps can be expensive to manufacture and may increase the production cost of the engine.

The inventors herein have developed a system that may provide the above benefits at lower expense. For example, the system may include an internal combustion engine having a combustion chamber, a first injector to provide a first injection fluid to the cylinder, and a heated pressurization system to heat the first injection fluid in a pressure vessel to a specified temperature for injecting the first injection fluid to the cylinder by the first injector at a specified injection pressure.

As an example, the first injection fluid may be a composition of alcohol and water that may be directly injected to the cylinder in response to high cylinder temperature/pressure, engine knock, etc. By heating the injection fluid in a pressure vessel, pressure in the vessel can be increased to the specified injection pressure. In this way, the injection fluid may be provided at the injection pressure without the use of a costly high pressure positive displacement pump, although a pump may additionally be used, if desired. Accordingly, the high pressure positive displacement pump may, in some cases, be omitted from the engine and the production cost of the engine may be reduced.

It will be understood that the summary above is provided to introduce in simplified form a selection of concepts that are further described in the detailed description, which follows. It is not meant to identify key or essential features of the claimed subject matter, the scope of which is defined by the claims that follow the detailed description. Further, the claimed subject matter is not limited to implementations that solve any disadvantages noted above or in any part of this disclosure.

BRIEF DESCRIPTION OF THE DRAWINGS

The subject matter of the present disclosure will be better understood from reading the following detailed description of non-limiting embodiments, with reference to the attached drawings, wherein.

DETAILED DESCRIPTION

Figure 1:
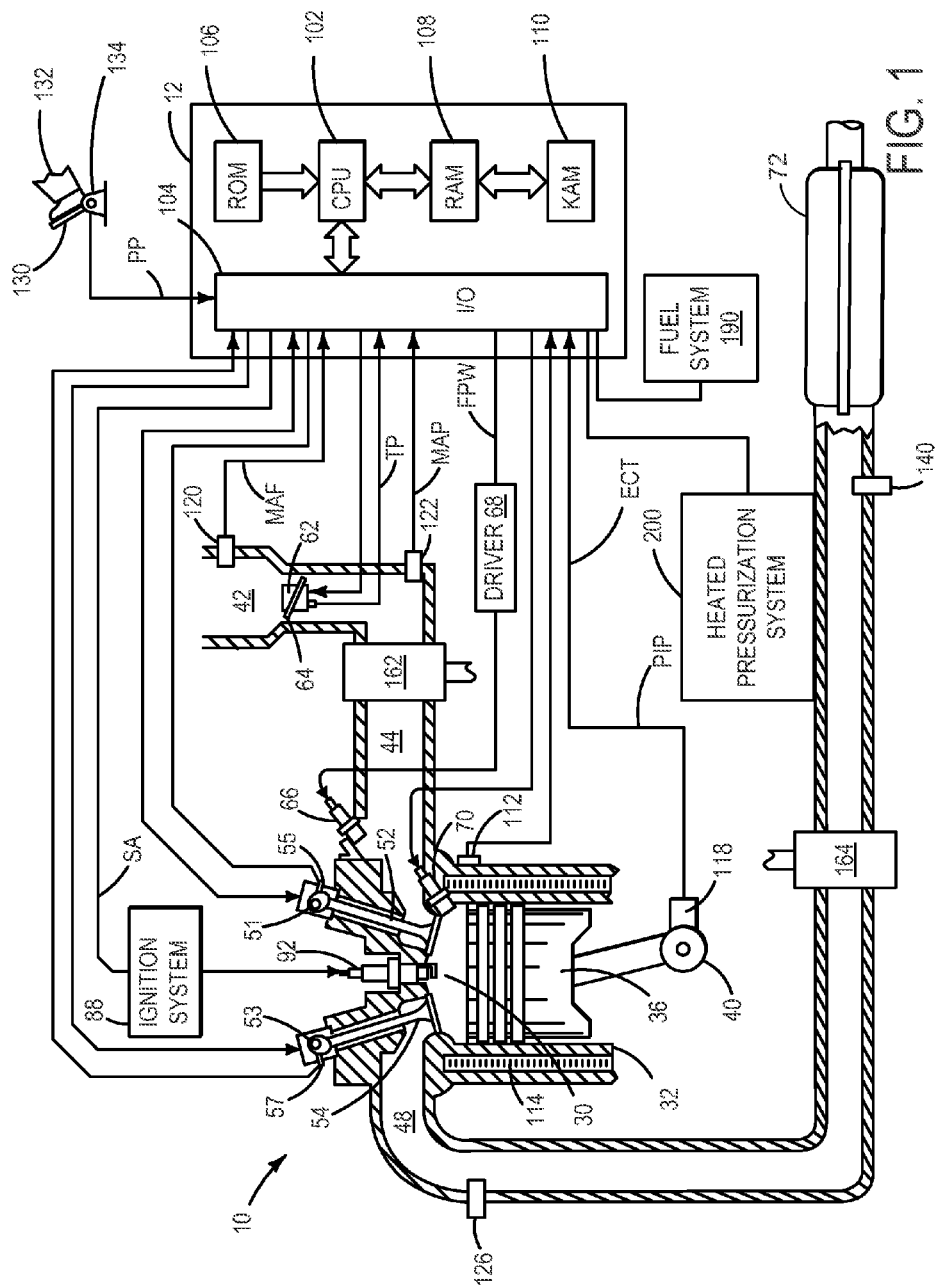
FIG. 1 is a schematic diagram of an embodiment of an engine system.

The following description relates to systems and methods for controlling vapor pressure of an injected fluid to provide the injected fluid at a specified injection pressure for injection into cylinders of an engine. More particularly, the injection fluid may be heated in a pressure vessel to a controlled temperature or pressure in order to provide the injection fluid at the desired injection pressure. As depicted in FIG. 1, an engine includes a dual fuel system that is configured with a port injection (PI) injector and a direct injection (DI) injector. The PI injector may receive fuel at a specified injection pressure via a fuel pump. The DI injector may receive injection fluid, such as Water/Methanol/Ethanol (WME), via a pressurization system that heats the injection fluid to provide the injection fluid at a specified injection pressure. By providing port injected fuel via a fuel pump and direct injected WME via a heated pressurization system, fuel may be provided nearly on-demand for engine start and warm up conditions and WME may be provided for other conditions (e.g., high cylinder temperature/pressure) without the use of a high pressure positive displacement pump that otherwise would be used to provide the injection pressure for direct injection. In this way, the high pressure positive displacement pump may be omitted from the engine to reduce engine production costs. In other words, since the WME is not a requisite immediately upon engine start or warm up, it can be brought to injection pressure in a way that is slower but more cost effective relative to the high pressure positive displacement pump, yet is fast enough to be injected during suitable operating conditions (e.g., higher cylinder temperature/pressure).

Figure 2:
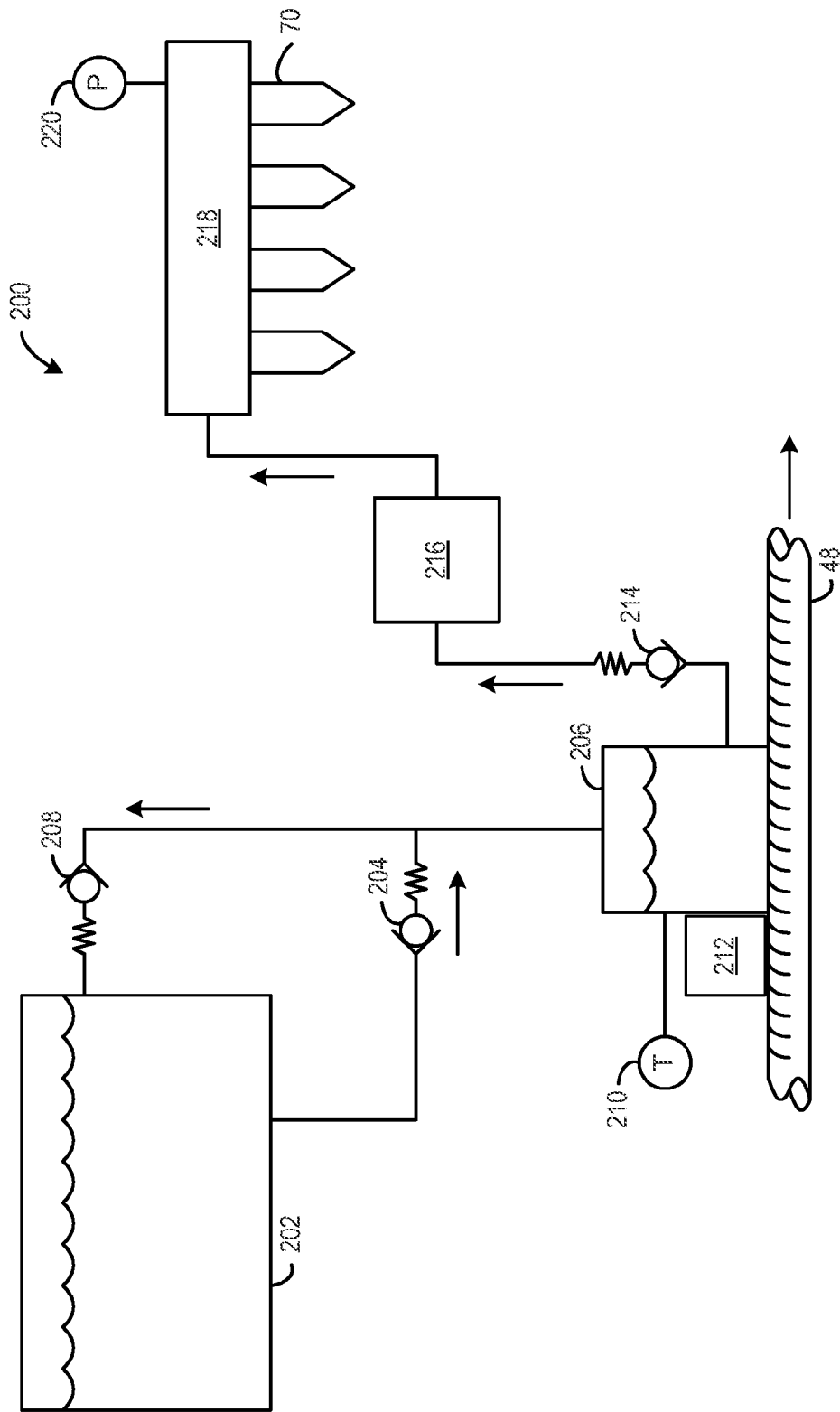
FIG. 2 is a schematic diagram of an embodiment of a heated injection fluid pressurization system.
Figure 3:
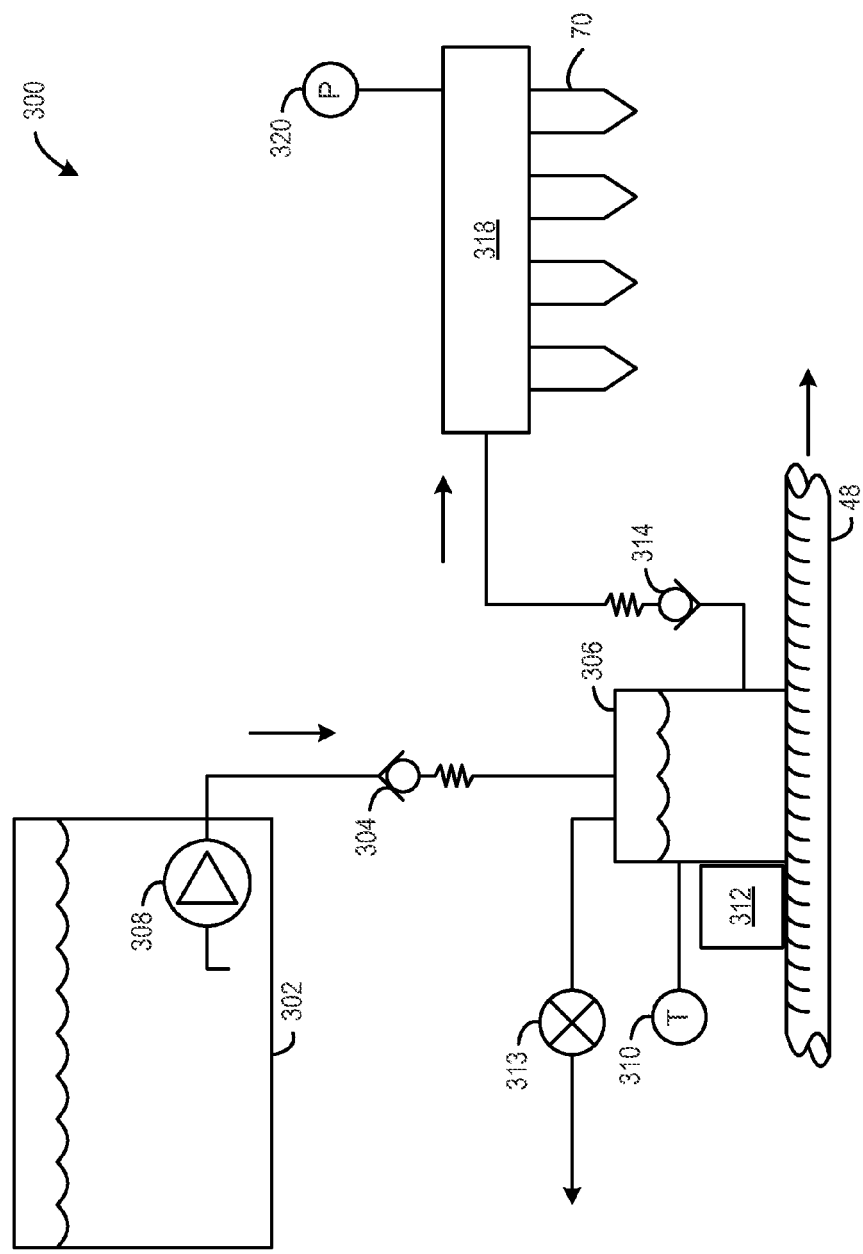
FIG. 3 is a schematic diagram of another embodiment of a heated injection fluid pressurization system.

Furthermore, as depicted in FIGS. 2-3, the heated pressurization system includes a pressure vessel that may be in thermal conductive contact with an exhaust passage of the engine. Heated exhaust gas flowing through the exhaust passage can be used as an energy source to heat the pressure vessel to provide the injection fluid at the injection pressure for direct injection. In this way, energy losses related to exhaust heat may be partially recovered. Moreover, by heating the injection fluid itself as opposed to heating an intermediary fluid to build injection pressure, the injection fluid pressurization system may be made less complex, which may further reduce engine production costs.

Figure 4:
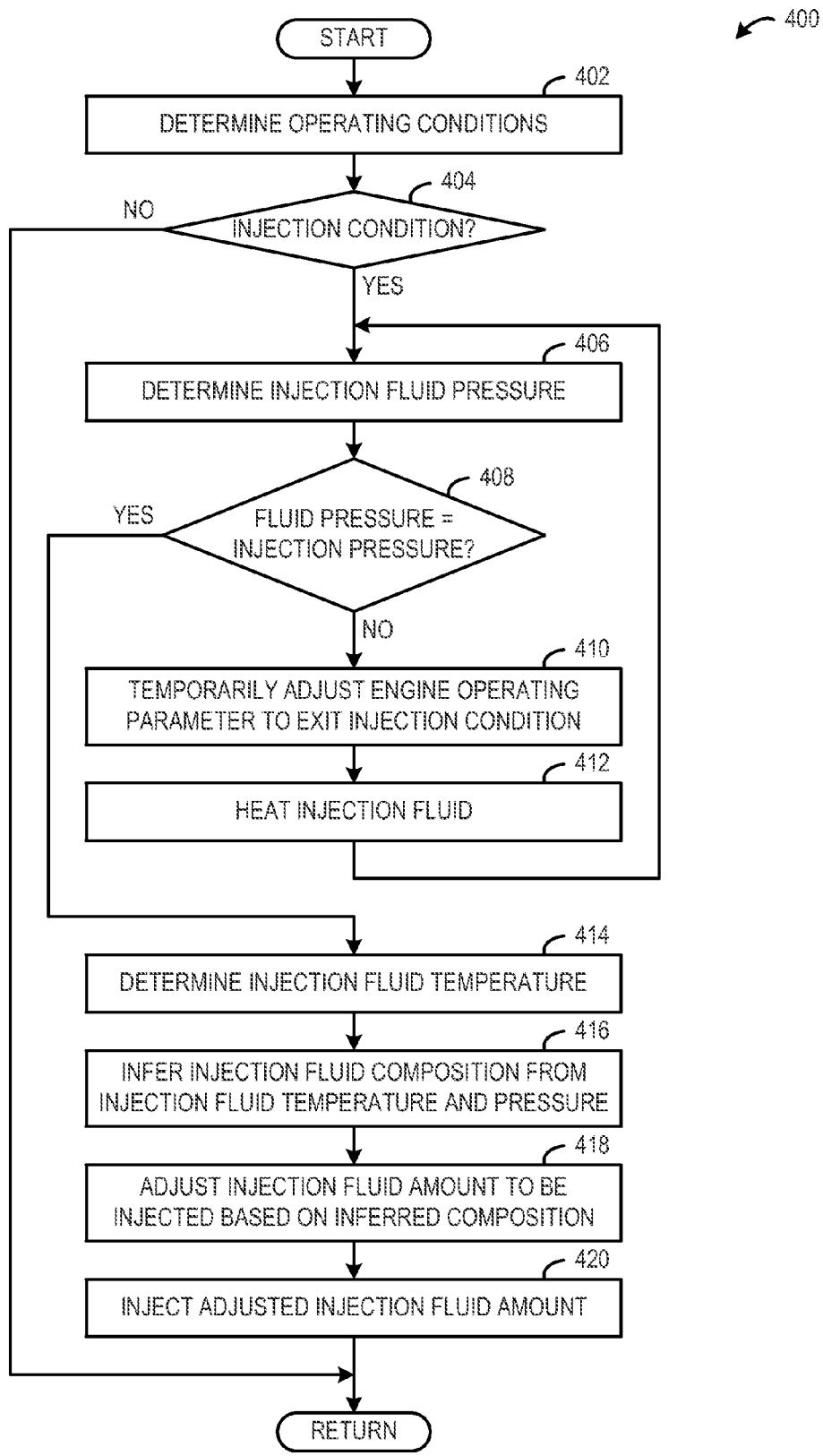
FIG. 4 is a flow diagram of an embodiment of a method to control pressurization and injection of a fluid into cylinders of an engine.

Further still, an engine controller may be configured to adjust operation of the heated pressurization system to heat the direct injection fluid to a predetermined injection pressure by performing a control routine, such as the routine depicted in FIG. 4. In cases where a plurality of substances that make up the injection fluid are identified (e.g., a blend of ethanol and water), the engine controller may infer the composition of the injection fluid based on characteristics of the substances and the pressure and temperature of the saturated injection fluid in the pressure vessel when the injection fluid is heated to the injection pressure. It will be appreciated that the injection fluid becomes saturated when gas and liquid coexist in the pressure vessel. Further, the engine controller may adjust the amount of injected fluid based on the composition. By adjusting the fluid injection amount based on the inferred composition of the injection fluid, combustion can be controlled more accurately to aid in stoichiometric operation.

FIG. 1 is a schematic diagram showing one cylinder of multi-cylinder engine 10, which may be included in a propulsion system of an automobile. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber (i.e., cylinder) 30 of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via respective intake valve 52 and exhaust valve 54. In some embodiments, combustion chamber 30 may include two or more intake valves and/or two or more exhaust valves.

In this example, intake valve 52 and exhaust valves 54 may be controlled by cam actuation via respective cam actuation systems 51 and 53. Cam actuation systems 51 and 53 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 52 and exhaust valve 54 may be determined by position sensors 55 and 57, respectively. In alternative embodiments, intake valve 52 and/or exhaust valve 54 may be controlled by electric valve actuation. For example, cylinder 30 may alternatively include an intake valve controlled via electric valve actuation and an exhaust valve controlled via cam actuation including CPS and/or VCT systems.

Engine 10 includes a dual injector system to provide fluid for combustion to cylinder 30. Each of the cylinders may inject one or more different types of fluids, alone or in combination, for combustion. For example, a first injector may inject gasoline or a gasoline blend (e.g., gasoline and ethanol) and a second injector may inject WME or a blend thereof. In some embodiments, a cylinder may inject an injection fluid that is one of a liquid hydrocarbon, an alcohol, and an alcohol-water mixture. In some embodiments, one or more injectors may be dedicated to injecting a particular type of fluid. In some embodiments, one or more injectors may be provided with different fluids based on engine configurations and/or operating conditions. For example, under some conditions an injector may inject WME and under different conditions the injector may inject gasoline. Examples discussed herein describe a configuration in which a first injector injects gasoline or a gasoline blend via port injection and a second injector injects WME or a combination thereof via direct injection. However, it will be appreciated that the injectors may inject any suitable fluid or combination of fluids to facilitate combustion.

Injector 66 is shown arranged in intake manifold 44 in a configuration that provides what is known as port injection (PI) of fuel (e.g., gasoline) into the intake port upstream of combustion chamber 30. Injector 66 may inject fuel in proportion to the pulse width of signal FPW received from controller 12 via electronic driver 68. Injector 70 is shown coupled directly to combustion chamber 30 for injecting WME directly therein. In this manner, fuel injector 70 provides what is known as direct injection of fuel into combustion chamber 30. The fuel injector may be mounted in the side of the combustion chamber or in the top of the combustion chamber, for example.

Injector 66 and injector 70 may inject different fluids at different pressure levels. Accordingly, different pressurization systems may be used to provide fluids to the injectors at different injection pressures. Fuel may be delivered to injector 66 by a fuel system 190 including a fuel tank, a fuel pump, and a fuel rail. Since injector 66 provides fuel via port injection, the injection pressure may be lower than the pressure of fluid provided via direct injection. As such, a low pressure or lift pump may used to provide fuel to injector 66 and a high pressure positive displacement pump is not needed.

A heated pressurization system 200 may provide WME to injector 70 at an injection pressure suitable for direct injection. In particular, WME may be heated in a pressure vessel to a controlled temperature or pressure to provide the injection pressure. The pressure vessel may include any suitable steam or heat pump. For example, the pressure vessel may include a WME storage tank. In this example, the pressure vessel contains all on-board stored WME (e.g., full tank pressurization). As another example, a pressure vessel may include a specified quantity of WME that is heated and injected and refilled, such as through thermal cycling. As yet another example, the pressure vessel may include two alternately used pressure cylinders so that one is refilled while the other provides the injection pressure, such as a pulsometer.

The pressure vessel may be heated by any suitable heat source. For example, the pressure vessel may be in conductive thermal contact with exhaust passage 48 and heated exhaust gas may be used as an energy source to heat the pressure vessel. Additionally, or alternatively an electric heater may be used to heat the pressure vessel. To limit WME pressure, control of the temperature of the exhaust-heated surface may occur via exhaust gas routing (similar to bi-metal heat stoves in older carbureted vehicles). Control of the liquid WME in contact with the heated surface also can limit WME pressure. Embodiments of the heated pressurization system will be discussed in further detail below with reference to FIGS. 2-3.

In some embodiments, heating and/or injection of WME may be delayed until after engine warm up so as not scavenge heat energy that would otherwise be used to heat emission control devices, engine coolant, etc. As an example, the engine can be determined to be sufficiently warm when the engine coolant temperature has reached a temperature threshold. As another example, the engine can be determined to be sufficiently warm when the emission control device temperature has reached a temperature threshold, such as the light off temperature.

Continuing with FIG. 1, intake passage 42 may include a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake passage 42 may include a mass air flow sensor 120 and a manifold air pressure sensor 122 for providing respective signals MAF and MAP to controller 12.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

Engine 10 may further include a compression device such as a turbocharger or supercharger including at least a compressor 162 arranged along intake manifold 44. For a turbocharger, compressor 162 may be at least partially driven by a turbine 164 (e.g. via a shaft) arranged along exhaust passage 48. For a supercharger, compressor 162 may be at least partially driven by the engine and/or an electric machine, and may not include a turbine. Thus, the amount of compression provided to one or more cylinders of the engine via a turbocharger or supercharger may be varied by controller 12. During some conditions (e.g., high engine torque demand), the compression device may be operated to increase engine boost into cylinders of the engine that may cause higher engine pressure. Accordingly, injector 70 may be operated by controller 12 to inject WME directly into cylinder 30 in order to lower the cylinder pressure/temperature and/or to suppress engine knock. Accordingly, engine output may be provided to meet the high engine torque demands while suppressing engine knock and inhibiting engine degradation.

Exhaust gas sensor 126 is shown coupled to exhaust passage 48 upstream of emission control device 72. Sensor 126 may be any suitable sensor for providing an indication of exhaust gas air-fuel ratio such as a linear oxygen sensor or UEGO (universal or wide-range exhaust gas oxygen), a two-state oxygen sensor or EGO, a HEGO (heated EGO), a NOx, HC, or CO sensor. Emission control device 72 is shown arranged along exhaust passage 48 downstream of exhaust gas sensor 126. Device 72 may be a three way catalyst (TWC), NOx trap, various other emission control devices, or combinations thereof. In some embodiments, during operation of engine 10, emission control device 72 may be periodically reset by operating at least one cylinder of the engine within a particular air-fuel ratio. Exhaust temperature sensor 140 is positioned in exhaust passage 48 to provide the temperature of exhaust gas in the exhaust passage. Signals from exhaust temperature sensor 140 may be used to determine the temperature of emission control device 72 and further to determined if it is heated to an operational or light-off temperature during engine warm-up.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal, MAP, from sensor 122. Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft.

Further, as shown in FIGS. 2-3, heated pressurization system 200 may include sensors that send signals to controller 12 that may be used to control operation of the heated pressurization system. In particular, a temperature sensor may send signals indicating the temperature of injection fluid in the pressure vessel to controller 12 and a pressure sensor may send signals indicating the pressure of the injection fluid provided from the pressure vessel to injector 70 to controller 12. Moreover, controller 12 may be configured to carry out a control routine that infers a composition of the fluid to be injected by injector 70 based on the substances that make up the fluid and the pressure and temperature signals when the fluid is brought to injection pressure, and adjusts the amount of fluid to be injected by injector 70 based on the inferred composition. In this way, the amount of fluid may be injected more accurately to aid in stoichiometric operation.

Storage medium read-only memory 106 can be programmed with computer readable data representing instructions executable by processor 102 for performing the methods described below as well as other variants that are anticipated but not specifically listed.

As described above, FIG. 1 shows only one cylinder of a multi-cylinder engine, and that each cylinder may similarly include its own set of intake/exhaust valves, fuel injectors, spark plug, etc.

FIG. 2 shows an embodiment of a heated injection fluid pressurization system 200 (referred to herein as "pressurization system"). Pressurization system 200 may be implemented in an engine system, such as the one illustrated in FIG. 1, to increase the pressure of fluid to a specified pressured for injection into cylinders of the engine. The pressurization system will be discussed in the context regulating the pressure of WME or a composition thereof. However, it will be appreciated that the pressurization system may be implemented to regulate the pressure of any suitable fluid for injection.

Pressurization system 200 may be configured to heat injection fluid to create vapor pressure so as to regulate the pressure of the injection fluid at a specified injection pressure. Pressurization system 200 includes an injection fluid storage tank 202. In embodiments where the injection fluid is WME, the injection fluid may be injected less frequently than fuel, and storage tank 202 may be relatively small as compared to a fuel storage tank. For example, the storage tank may on a size scale of a washer fluid bottle. Storage tank 202 selectively communicates with pressure vessel 206 via check valve 204 and pressure relief valve 208. More particularly, when depressurized, injection fluid can be provided from storage tank 202 through check valve 204 to fill pressure vessel 206. Pressure vessel 206 may be heated to build vapor pressure of the injection fluid in the pressure vessel. In the illustrated embodiment, pressure vessel 206 is in conductive thermal contact with exhaust passage 48. Accordingly, when heated exhaust travels through exhaust passage 48, heat energy may be conductively transferred through the sidewall of the exhaust passage to the pressure vessel to heat the injection fluid and produce vapor to increase the pressure of the injection fluid. By heating the pressure vessel using heat energy of exhaust gas, a potential parasitic loss may be reduced to increase the operating efficiency of the vehicle.

The below saturated steam table shows the pressures that are built with steam. These temperatures may be achieved from the heat energy of engine exhaust. However, other heat sources may not provide enough heat energy to build suitable pressure. For example, engine coolant does not have enough heat energy to achieve these pressure levels.

| Pressure (gauge) | Temperature |
| --- | --- |
| 0.50 MPa | 152° C. |
| 1.00 MPa | 180° C. |
| 2.00 MPa | 212° C. |
| 3.00 MPa | 234° C. |

At cold engine start conditions, vapor pressure may build in pressure vessel 206 at a slower rate since there is less heat energy in the exhaust traveling through exhaust passage 48. Due to the slower rate of increase in pressure, the injection fluid is not available for injection at the injection pressure at engine start. On the other hand, fuel is provided by a fuel pump to meet combustion demands for engine start. However, since WME is not a requisite for combustion when fuel is provided, especially at cold start, the WME may be brought to injection pressure more slowly without inhibiting engine start.

In some embodiments, to augment heating of the injection fluid an electric heater 212 may operated to provide heat to the pressure vessel so that the injection fluid may be brought to injection pressure more quickly at engine start in order to be available for injection. In particular, heating may be augmented at engine start to handle WME injection conditions shortly after engine start, such as high engine output conditions. Moreover, the electric heater may be operable during engine warm up conditions so as not to scavenge heat energy from exhaust gas that would otherwise be used to heat engine coolant, emission control devices, etc. Further, in some embodiments, heating and/or injection may be delayed until after the engine has warmed up so as to not to increase the time to engine warm up by scavenging heat energy. In some embodiments, the pressure vessel may be heated by the electric heater without heat from the exhaust passage. It will be appreciated that any suitable energy source may be used to heat the pressure vessel.

It will be appreciated that time for the injection fluid to reach the desired injection pressure may depend on heating the fluid vapor to act on the larger fluid mass in the pressure vessel. Accordingly, the size of the pressure vessel may be designed to meet time to injection pressure demands and the whole injection fluid need not be heated to get the liquid to be injected to the target vapor pressure (e.g., injection pressure). So, in applications where WME may be injected shortly after engine start, the pressure vessel may be smaller for quicker time to pressure. In applications where WME does not need to be available, the pressure vessel may be larger. In some embodiments, the storage tank may act as the pressure vessel so that the all of the stored quantity of WME is heated to injection pressure.

Continuing with FIG. 2, upon the pressure in pressure vessel 206 being heated to reach a specified injection pressure, injection fluid may be supplied through check valve 214, through pressure regulator 216 to injection rail 218, where the injection fluid may be available for injection by DI injector 70. DI injector may be operated by controller 12 to inject WME under certain operating conditions derived from operating parameters provided by various engine and/or vehicle sensors. Pressurization system 200 may include temperature sensor 210 to indicate the temperature of fluid in pressure vessel 206. Signals from temperature sensor 210 may be used by controller 12 in a control routine to regulate the pressure of injection fluid. For example, pressure vessel 206 may be heated until the temperature sensor indicates that the injection fluid has reached a predetermined temperature that corresponds to the injection pressure. To regulate the temperature and/or pressure of the injection fluid, controller 12 may operate pressure relief valve 208 so that the injection fluid remains at the injection pressure. Further, pressurization system may include pressure sensor 220 to indicate the pressure of fluid provided from the pressure vessel to injection rail 218. Signals from temperature sensor 210 and pressure sensor 220 may be considered in conjunction to regulate the pressure of WME at the injection pressure.

Pressure vessel 206 may act as a steam/heat pump that thermally cycles with storage tank 202 to refill the pressure vessel with injection fluid. In other words, as the pressure vessel cools down, a pressure differential may be created that draws injection fluid from the storage tank to refill the pressure vessel. In the illustrated embodiment, the pressure vessel is filled upon cooling of the pressure vessel, such as upon engine shut off. Accordingly, cool down conditions may occur sporadically, as such the pressure vessel may have a capacity for injection fluid large enough to provide fluid for injection during extended operation. In the case that the pressure vessel is not refilled or the storage tank is empty, direct injection may be temporarily disabled. Multiple systems that cycle out of phase with one another may increase the availability of high pressure WME.

FIG. 3 shows another embodiment of a heated injection fluid pressurization system 300 (referred to herein as "pressurization system"). Pressurization system 300 may be configured to actively refill pressure vessel 306 as opposed to pressurization system 200 which refills the pressure vessel passively via thermal cycling. The passively filled pressurization system 200 may be eschewed in favor of the illustrated embodiment, in applications where WME is injected at a higher rate, because the actively refill capability may refill the pressure vessel in a quicker manner.

Pressurization system 300 includes an injection fluid storage tank 302. A fluid pump 308 is positioned in storage tank 302. Fluid pump 308 actively pumps fluid from storage tank 302 through check valve 304 to pressure vessel 306 to fill the pressure vessel. The fluid pump may be any suitable pump to fill the pressure vessel with injection fluid from the storage tank. For example, the fluid pump may be a windshield washer fluid type pump.

Since injection fluid is actively pumped into pressure vessel 306 there is no pressure relief valve between the pressure vessel and the storage tank. Instead, a vent solenoid 313 that is connected to the pressure vessel may be operated to relieve pressure in the pressure vessel for refilling when the pressure vessel is hot. In some embodiments, the vent solenoid is positioned between the pressure vessel and the exhaust passage. In some embodiments, the vent solenoid is positioned between the pressure vessel and the intake passage. In some embodiments, the vent solenoid is positioned between the pressure vessel and a fuel vapor canister.

It will be appreciated that the vent solenoid may be implemented in pressurization system 200 to enable pressure to be relieved from the pressure vessel when hot. In particular, operation of the vent solenoid may cause a pressure differential that draws injection fluid into the pressure vessel. As such, the pressure vessel of pressurization system 200 may be refilled when hot.

In some embodiments, to augment heating of the injection fluid an electric heater 312 may operated to provide heat to the pressure vessel so that the injection fluid may be brought to injection pressure more quickly at engine start in order to be available for injection. In particular, heating may be augmented at engine start to handle WME injection conditions shortly after engine start, such as higher engine output conditions. Moreover, the electric heater may be operable during engine warm up conditions so as not to scavenge heat energy from exhaust gas that would otherwise be used to heat engine coolant, emission control devices, etc. Further, in some embodiments, heating and/or injection may be delayed until after the engine has warmed up so as to not to increase the time to engine warm up by scavenging heat energy. In some embodiments, the pressure vessel may be heated by the electric heater without heat from the exhaust passage. It will be appreciated that any suitable energy source may be used to heat the pressure vessel.

Upon the pressure in pressure vessel 306 being heated to reach a specified injection pressure, injection fluid may be supplied through check valve 314 to injection rail 318, where the injection fluid may be available for injection by DI injector 70. DI injector may be operated by controller 12 to inject WME under certain operating conditions derived from operating parameters provided by various engine and/or vehicle sensors.

Pressurization system 300 may include temperature sensor 310 to indicate the temperature of fluid in pressure vessel 306. Signals from temperature sensor 310 may be used by controller 12 in a control routine to regulate the pressure of injection fluid. For example, pressure vessel 306 may be heated until the temperature sensor indicates that the injection fluid has reached a predetermined temperature that corresponds to the injection pressure. Further, pressurization system may include pressure sensor 320 to indicate the pressure of fluid in injection rail 318. Signals from temperature sensor 310 and pressure sensor 320 may be considered in conjunction to regulate the pressure of WME at the injection pressure.

The above described passively filled pressurization system 200 and actively controlled pressurization system 300 are merely examples of steam-powered pump systems that may be implemented to heat injection fluid to a specified injection pressure. It will be appreciated that any suitable steam-powered pump system that uses vapor pressure of injected fluid to provide the injection pressure may be implemented without departing from the scope of the present disclosure. For example, if continuous pumping at steam pressure is desired, a pulsometer pump design can be implemented. Otherwise, if continuous availability of pressure is a requirement, multiple systems (FIG. 3) can be deployed that cycle out of phase relative to each other. This gets one system re-filling/re-pressurizing while the other supplies pressurized fluid.

The configurations illustrated above enable various methods for controlling pressurization and injection of fluid into cylinders of an engine of a motor vehicle. Accordingly, some such methods are now described, by way of example, with continued reference to above configurations. It will be understood, however, that these methods, and others fully within the scope of the present disclosure, may be enabled via other configurations as well. These methods may represent one or more different processing strategies such as event-driven, interrupt-driven, multi-tasking, multi-threading, and the like. As such, the disclosed process steps (operations, functions, and/or acts) may represent code to be programmed into computer readable storage medium in an electronic control system.

Controller 12 may be configured to perform a control routine, as shown in FIG. 4, to control pressurization and injection of a fluid into cylinders of an engine by heating the injection fluid to a specified injection pressure. The method will be described using the example of directly injecting an injection fluid composed of a plurality of substances that are identified via a DI injector of a dual injection system of a boosted engine as shown in FIG. 1. As an example, it may be identified that the injection fluid is made up of a combination of ethanol and water. However, the method may be broadly applicable to other engine configurations and injection fluids. The method 400 may include, at 402, determining operating conditions. Determining operating conditions may include receiving signals from engine sensors and determining operating parameters, such as driver demand, engine torque demand, cylinder pressure/temperature, engine knock, emission control device temperature, etc.

At 404, the method may include determining if an injection condition exists. An injection condition may be a condition in which an injector may be operated to inject injection fluid into a cylinder. In the case of directly injecting a composition of water and ethanol, the injection condition may be determined based on operating parameters such as cylinder temperature/pressure, detection of engine knock, emission control device temperature, or the like. If an injection condition exists, the method moves to 406. Otherwise, the injection condition does not exist and the control routine returns to other operations.

In some embodiments, an injection condition may be based at least in part on whether or not the engine has warmed up to a suitable operating temperature. An indication that the engine has warmed up may be based on the temperature of an emission control device in the exhaust passage of the vehicle or the temperature of engine coolant. In particular, heating or injection of injection fluid that is heated to a specified injection pressure may be delayed so as inhibit scavenging of heat energy that would otherwise be used to warm up emissions control devices, engine coolant, etc during engine warm up.

At 406, the method may include determining an injection fluid pressure. As an example, the pressure of the injection fluid is measured by pressure sensor 220/320 of the heated pressurization system.

At 408, the method may include determining if the pressure of the injection fluid is equal to a specified injection pressure. The specified injection pressure may be set to any pressure for suitable injector operation, and more particularly DI injector operation. In some embodiments, a pressure regulator may be positioned between the pressure vessel and the injection rail to inhibit the pressure of the injection fluid from increasing above the specified injection pressure. If the pressure of the injection fluid is equal to the specified injection pressure the method moves to 410. Otherwise, the pressure of the injection fluid is not equal to the specified injection pressure and the method moves to 418.

At 410, the method may include temporarily adjusting engine operating parameter(s) to exit the injection condition when possible. Since the injection fluid is not up to injection pressure and is therefore not available for injection, attempts to avert the injection condition can be attempted by adjusting an operating parameter. For example, air-fuel ratio control may be adjusted rich to suppress engine knock. As another example, an engine boost level may be reduced to reduce cylinder pressure.

At 412, the method may include heating the injection fluid. The injection fluid may be heated to produce vapor to increase the pressure to the specified injection pressure. By heating the injection fluid itself as opposed to heating an intermediary fluid to build injection pressure, the injection fluid pressurization system may be made less complex, which may further reduce engine production costs.

The injection fluid may be heated in various ways. For example, the injection fluid may be heated via thermal conductive contact with the exhaust passage so that heat energy from exhaust gas heats the injection fluid to the specified injection pressure. By using the exhaust gas as an energy source to heat the injection fluid, parasitic losses associated with exhaust heat may be reduced.

As another example, heating may include operating an electric heater to heat the injection fluid to provide the injection fluid at the specified injection pressure. In some cases, an electric heater may be operated in conjunction with exhaust heat to heat the injection fluid more rapidly. Upon heating the injection fluid, the method returns to 406 and the control routine continues operation.

At 414, the method may include determining an injection fluid temperature. As an example, the temperature of the injection fluid is measured in the pressure vessel by temperature sensor 210/310 of the heated pressurization system.

At 416, the method may include inferring the injection fluid composition from the determined temperature and pressure of the injection fluid. The inference can be made since the substances that make up injection fluid are identified and the injection fluid is heated in a fixed volume (e.g., the pressure vessel) to the point of saturation. More particularly, in this example the partial pressure of ethanol is a function of the temperature and the mole fraction of ethanol in the composition. Likewise, the partial pressure of water is a function of the temperature and the mole fraction of water in the composition. Correspondingly, the sum of the partial pressure of ethanol and the partial pressure of water is equal to the total pressure and the sum of the mole fraction of water and the mole fraction of ethanol are equal to one. Thus, the functions can be solved using the boiling point constants for ethanol and water to infer the percent of ethanol and the percent of water in the composition of the injection fluid.

In this example, the injection fluid is made up of two identified substances (e.g., water and ethanol) having characteristics (e.g., boiling point and mole fraction) that are used along with the temperature and pressure of the injection fluid to infer the composition of the injection fluid. However, the injection fluid may be made up of any suitable number of identified substances, such as a WME blend. Further, the composition of the injection fluid may be inferred using a series of functions based on characteristics of the identified substances such as the mole fraction and/or boiling point constants of the substances as well as the temperature and pressure of the injection fluid measured in the heated pressurization system.

At 418, the method may include adjusting the injection fluid amount to be injected based on the inferred composition. That is, the amount of fluid to be injected may be adjusted to compensate for more or less of a particular element of the composition. For example, if it is inferred that the injection fluid is composed of a greater amount of ethanol than water, then the injection amount may be reduced to compensate for the greater energy density of the ethanol so as to maintain engine operation at stoichiometry.

At 420, the method may include injecting the adjusted injection fluid amount into the cylinder. By adjusting the fluid injection amount based on the inferred composition of the injection fluid, combustion can be controlled more accurately to aid in stoichiometric operation.

The above described method may enable an injection fluid such as alcohol, water, or a blend thereof to be directly injected by heating the injection fluid and using the resulting vapor pressure of the injection fluid to provide the injection pressure. The method may be used to control a dual injection system in which WME is directly injected and fuel, such as gasoline is port injected. By performing the method in the dual injection system, fuel may be provided nearly on-demand for engine start and warm up conditions and WME may be provided for other conditions (e.g., high cylinder temperature/pressure) without the use of a high pressure positive displacement pump that otherwise would be used to provide the injection pressure for direct injection. In this way, the high pressure positive displacement pump may be omitted from the engine to reduce engine production costs. In other words, since the WME is not a requisite immediately upon engine start or warm up, it can be brought to injection pressure in a way that is slower but more cost effective relative to the high pressure positive displacement pump, yet is fast enough to be available for injection during suitable operating conditions (e.g., high cylinder temperature/pressure).

Although the method is described in the context of a dual injection engine system that injects gasoline and WME, it will be appreciated that the method is broadly applicable to other engine configurations and/or may be applied to other types of injection fluid.

It will be understood that some of the process steps described and/or illustrated herein may in some embodiments be omitted without departing from the scope of this disclosure. Likewise, the indicated sequence of the process steps may not always be required to achieve the intended results, but is provided for ease of illustration and description. One or more of the illustrated actions, functions, or operations may be performed repeatedly, depending on the particular strategy being used.

Finally, it will be understood that the articles, systems and methods described herein are exemplary in nature, and that these specific embodiments or examples are not to be considered in a limiting sense, because numerous variations are contemplated. Accordingly, the present disclosure includes all novel and non-obvious combinations and sub-combinations of the various systems and methods disclosed herein, as well as any and all equivalents thereof.

The invention claimed is:

1. A system, comprising:
   a boosted engine including a cylinder and an exhaust passage;
   a first injector providing an alcohol-water mixture to the cylinder; and
   a heated pressurization system without a high-pressure pump to heat the alcohol-water mixture in a pressure vessel thermally conductively contacting the exhaust passage and upstream of the first injector, to a specified temperature for injecting the alcohol-water mixture to the cylinder by the first injector at a specified injection pressure.

2. The system of claim 1, further comprising:
   a second injector to provide a second injection fluid different than the alcohol-water mixture to the cylinder, and wherein the first injector is a direct cylinder injector and the second injector is a port injector.

3. The system of claim 1, wherein the heated pressurization system includes an electric heater operable to heat the alcohol-water mixture.

4. The system of claim 1, further comprising:
   the exhaust passage in conductive thermal contact with the pressure vessel to heat the alcohol-water mixture with heat energy from exhaust gas in the exhaust passage; and
   the heated pressurization system including an electric heater operable to heat the alcohol-water mixture.

5. The system of claim 1, wherein the alcohol-water mixture is made up of a plurality of identified substances; and the system further comprises:
   a controller having a computer readable storage medium, including code to infer a composition of the alcohol-water mixture based on characteristics of the plurality of identified substances, a temperature of the alcohol-water mixture, and a pressure of the alcohol-water mixture, and adjust an amount of the alcohol-water mixture to be provided to the cylinder by the first injector based on the composition.

6. The system of claim 5, upon a direct injection condition, the controller further having code to adjust an operating parameter in response to the pressure of the alcohol-water mixture not being at the specified injection pressure.

7. The system of claim 6, wherein the operating parameter is at least one of an air-fuel ratio and an engine boost level.

8. The system of claim 5, wherein the controller further comprises code to delay at least one of heating and injecting the alcohol-water mixture until the system has achieved a warm-up condition.

9. A method for a boosted engine including a cylinder and an exhaust, comprising:
   providing a fuel to the cylinder via a port injector during cold start; and
   providing a fluid to the cylinder via a direct injector after warm-up, the fluid at least partially pressurized in a pressure vessel upstream of the direct injector and in conductive thermal contact with the exhaust via exhaust heat and without a high-pressure pump, the fluid including a mixture of water, methanol, and ethanol.

10. The method of claim 9 wherein the pressure vessel is positioned contacting an exhaust passage of the engine.

11. The method of claim 10 wherein the pressure vessel contacts the exhaust passage downstream of a turbocharger turbine.

12. A system comprising:
   an internal combustion engine including a combustion chamber;
   an exhaust passage of the engine;
   a turbocharger with a turbine positioned in the exhaust passage;
   a direct cylinder injector to provide a blend of water, methanol, and ethanol to the combustion chamber;
   a port injector to provide a gasoline blend to the combustion chamber;
   a heated pressurization system without a high-pressure pump to heat the blend in a pressure vessel to a specified temperature for injecting the blend to the combustion chamber by the direct cylinder injector at a specified injection pressure, the pressure vessel positioned in conductive thermal contact with the exhaust passage, downstream of the turbine, and upstream of a fuel rail of the direct cylinder injector; and
   a controller including a computer readable storage medium with code to adjust an amount of direct injection based on operating conditions.

* * * * *